April 27, 1926.
G. CONSTANTINESCO
POWER TRANSMISSION
Filed Jan. 26, 1924   2 Sheets-Sheet 1
Fig. 1.
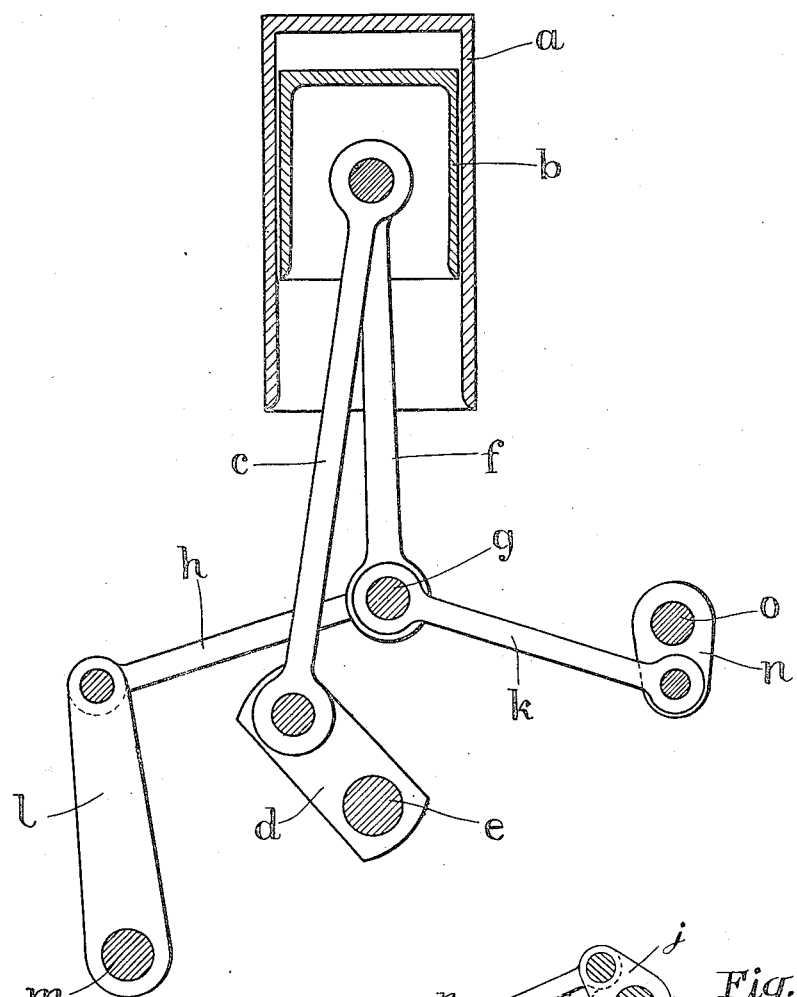
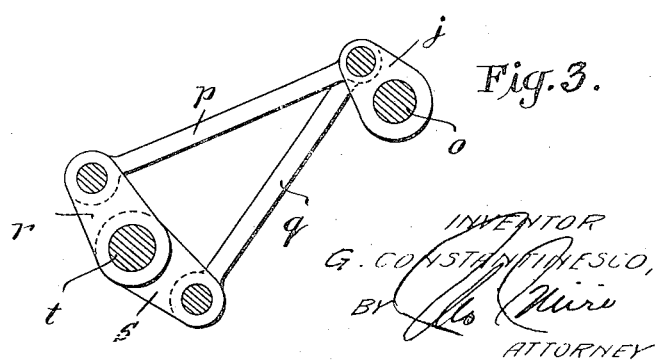
Fig. 3.
INVENTOR
G. CONSTANTINESCO,
BY
ATTORNEY

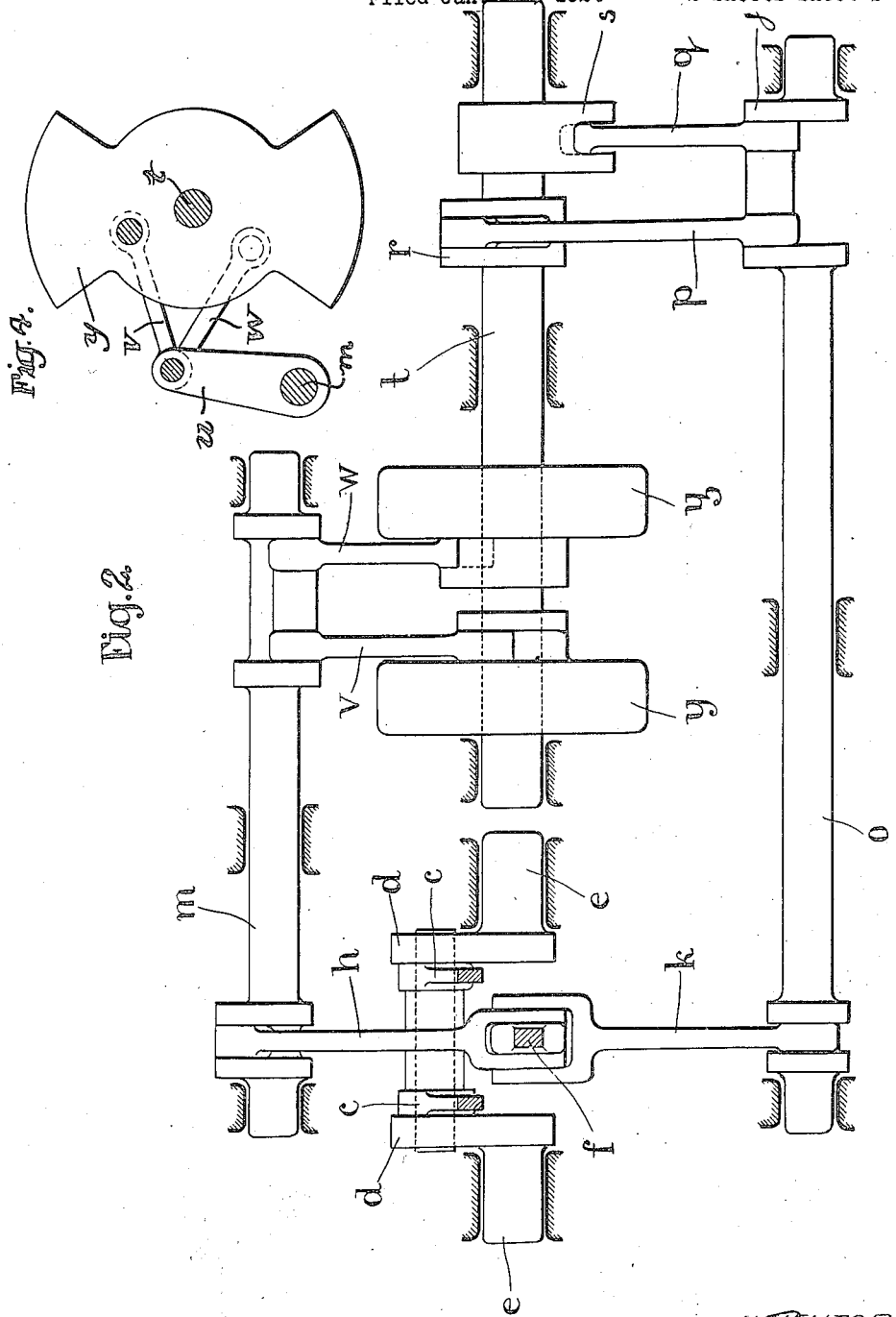

Patented Apr. 27, 1926.

1,582,734

UNITED STATES PATENT OFFICE.

GEORGE CONSTANTINESCO, OF WEYBRIDGE, ENGLAND.

POWER TRANSMISSION.

Application filed January 26, 1924. Serial No. 688,788.

*To all whom it may concern:*

Be it known that I, GEORGE CONSTANTINESCO, a subject of the King of Great Britain and Ireland, residing at "Carmen Sylva," Beechwood Avenue, Oatlands Park, Weybridge, in the county of Surrey, England, have invented certain new and useful Improvements in Power Transmission, of which the following is a specification.

The present invention is for a power unit in which transmission gear is used, which gear acts on the principle of the means for transmitting power from a steadily rotating shaft to a shaft subject to a resisting torque as claimed in the specification lodged with applications Serial No. 570,986 filed 26th June 1922, and No. 653,772 filed 25th June 1923.

In these specifications a power transmission gear is described in which oscillating motion derived from a prime mover is communicated partly to an oscillating mass and partly to a device which drives a rotor unidirectionally, the motion of the prime mover being distributed between the oscillating mass and the rotor. The proportion in which this motion is distributed depends upon the torque on the rotor. If there is no torque the oscillating mass receives little or none of the motion. If, on the other hand, the torque is infinite so that the rotor cannot move, the oscillating mass receives the whole of the motion of the prime mover.

The power unit in which the present invention consists comprises an internal combustion engine, the piston of which is connected as usual by a rod and crank to a steadily rotating or flywheel shaft. The piston, or any other reciprocating part of the prime mover, is connected directly and independently of the engine connecting rod, to the common pivot of two links which form a toggle. One link of the toggle actuates oscillating masses, or a single mass, while the other link actuates oscillators which cause a driven shaft to rotate unidirectionally. The toggle is disposed so that it oscillates symmetrically or substantially so about a mean position in which the two links are in line, the effect of which is that the oscillating mass or masses and the oscillators perform a complete oscillation for each stroke of the piston, or two for each revolution of the engine shaft.

Referring to the accompanying drawings, all of which show parts of the same machine:—

Fig. 1 is a section through the cylinder and crank shaft of a prime mover.

Fig. 2 is a plan showing the arrangement of the shafting and parts connected therewith.

Fig. 3 is a detail view showing the way in which the unidirectional driving devices are driven from a rocking shaft.

Fig. 4 is a detail view showing the way in which inertial masses are driven from a rocking shaft.

In the apparatus shown in the figures, the prime mover consists of a single cylinder engine having a cylinder $a$ in which moves a piston $b$. The piston is connected by the rod or rods $c$ to a crank $d$ on the primary shaft $e$, which rotates continuously. The piston is also connected by the rod $f$, directly and independently of the connecting rod or rods $c$, with the knuckle $g$ of a toggle $h$, $k$. The link $h$ actuates an oscillating crank $l$ on a rocking shaft $m$ and the link $k$ actuates another oscillating crank $n$ on a rocking shaft $o$. The shaft $m$ carries a crank $u$ connected by links $v$, $w$, with heavy masses $y$, $z$, which are mounted on the rotor shaft $t$ so as to oscillate. The links $v$, $w$, oscillate the masses in opposite phase. The masses are not fixed on the shaft $t$; they oscillate freely about it. The rocking shaft $o$ carries a crank $j$ which is connected by links $p$, $q$, with oscillating members $r$, $s$, which, like the masses $y$, $z$, are actuated in opposite phase. The oscillators carry ratchets or the like, which give unidirectional motion to a rotor fixed on the shaft $t$.

It will be seen that the toggle links oscillate symmetrically or substantially so about the position in which they are in line, and thus complete oscillations of the shafts $m$ and $o$ take place for each stroke of the piston, so that each of the driving ratchets make a complete oscillation for each stroke of the piston. In addition to this, it is evident that a distribution of the motion of the piston and of the shaft $e$ between the inertia masses $y$, $z$, and the oscillators $r$, $s$, takes place in the way described above. Thus if the resisting torque on the rotor is so great as to render it immovable, the oscillators $r$, $s$, the links $p$, $q$, the shaft $o$ and the crank $u$, are all stationary. The end of the link $k$ remote from the knuckle is therefore fixed, and the whole motion of the prime mover is absorbed in oscillating the masses $y$, $z$; if, on the other hand, there is no resisting torque on the rotor, the masses $y$, $z$, remain practically stationary by reason of their inertia. This fixes the shaft $m$, and similarly to the above described action, the whole motion of the prime mover is communicated to the rotor. For intermediate torques, the motion of the prime mover is distributed between the rotor and the masses $y$, $z$; the greater the torque, the greater the motion of the masses, and the less that of the rotor; and conversely. The principle is precisely the same as that of the invention described in my prior specifications above referred to.

With a double frequency arrangement of this type, long strokes are required, and the arrangement is therefore especially useful in combination with an internal combustion engine.

It will be seen that the combined unit may be applied to internal combustion engines having any number of cylinders. In such case, the different cylinders may be arranged to operate a number of transmission gears working in different phases on the same driven shaft.

The invention is specially suitable for use in motor vehicles. Obviously there need be but one oscillating mass.

What I claim is:—

1. A power unit comprising in combination a reciprocating part, a steadily rotating flywheel shaft and a connecting rod operatively connecting the said reciprocating part and the said flywheel shaft, a toggle, a link independent of the said connecting rod and operatively connecting the said reciprocating part with the knuckle of the said toggle so as to cause the knuckle to oscillate about the position in which both links of the toggle are collinear, a countershaft oscillated by one link of the toggle and carrying a crank, a pivoted oscillating mass operatively connected to said crank, a second countershaft oscillated by the other link of the toggle and carrying a crank, a pair of oscillators operated in opposite phase by the said last mentioned crank through linkage, and a rotor shaft unidirectionally driven by the said oscillators, the motion of the prime mover being thus distributed between the oscillating mass and the rotor in proportions depending upon the torque on the rotor.

2. A power unit comprising in combination a reciprocating part, a steadily rotating flywheel shaft, and a connecting rod operatively connecting the said reciprocating part and the said flywheel shaft, a toggle, a link independent of the said connecting rod and operatively connecting the said reciprocating part with the knuckle of the said toggle so as to cause the knuckle to oscillate about the position in which both links of the toggle are collinear, a countershaft oscillated by one link of the toggle and carrying a crank, two pivoted masses oscillated in opposite phase and operatively connected to said crank, a second counter-shaft oscillated by the other link of the toggle and carrying a crank, a pair of oscillators operated in opposite phase by the said last mentioned crank through linkage, and a rotor shaft unidirectionally driven by the said oscillators, the motion of the prime mover being thus distributed between the oscillating masses and the rotor in proportions depending upon the torque on the rotor.

In testimony whereof I affix my signature.

GEORGE CONSTANTINESCO.